No. 632,421. Patented Sept. 5, 1899.
M. MOSKOWITZ.
MEANS FOR GENERATING ELECTRICITY FROM CAR WHEEL AXLES.
(Application filed Aug. 3, 1898.)
(No Model.) 2 Sheets—Sheet 1.
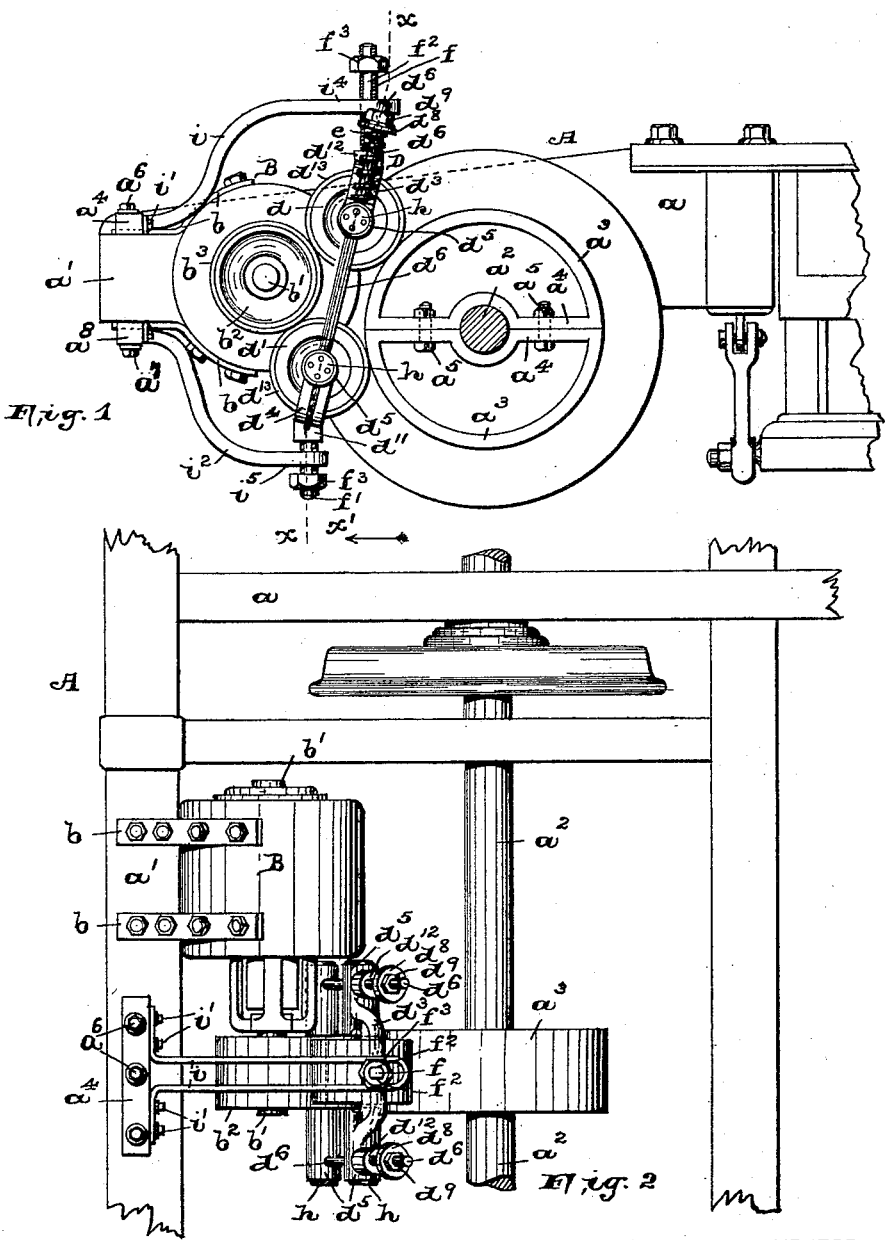
WITNESSES:
B. Mortimer Trusdell
Walter H. Talmage.
INVENTOR:
Morris Moskowitz,
BY
Fred'k C. Fraentzel.
ATTORNEY

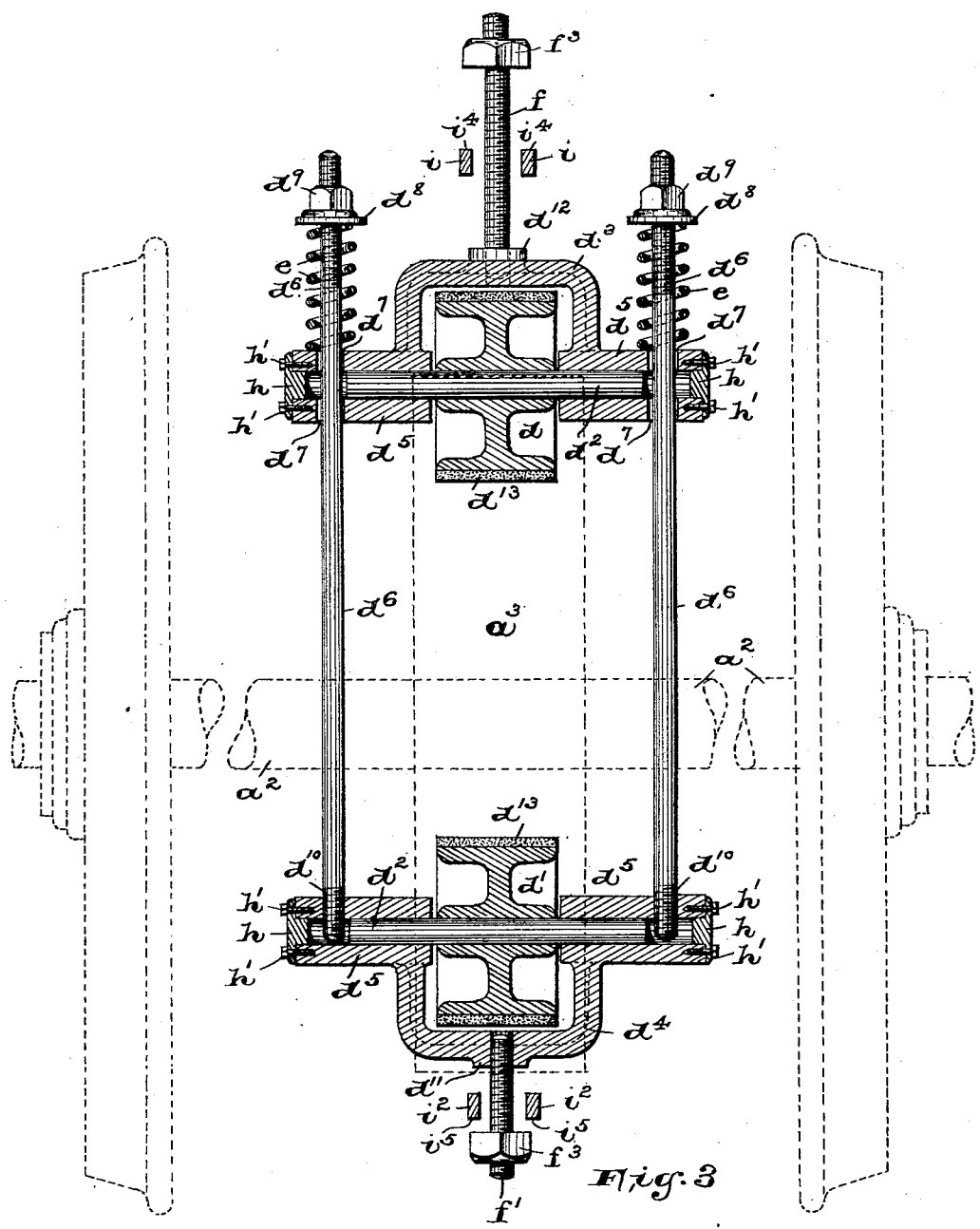

UNITED STATES PATENT OFFICE.

MORRIS MOSKOWITZ, OF NEWARK, NEW JERSEY, ASSIGNOR TO THE NATIONAL ELECTRIC CAR LIGHTING COMPANY, OF WEST VIRGINIA.

MEANS FOR GENERATING ELECTRICITY FROM CAR-WHEEL AXLES.

SPECIFICATION forming part of Letters Patent No. 632,421, dated September 5, 1899.

Application filed August 3, 1898. Serial No. 687,600. (No model.)

*To all whom it may concern:*

Be it known that I, MORRIS MOSKOWITZ, a citizen of the United States, residing at Newark, in the county of Essex and State of New Jersey, have invented certain new and useful Improvements in Means for Generating Electricity from Car-Wheel Axles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My present invention relates, primarily, to a novel means for driving an electric machine or dynamo arranged in a rigid position on the track of a railway-car from the car-wheel axle by means of a frictional power transmission.

This invention therefore has for its principal object to provide a frictional power transmission of a novel construction which is very simple and is effective when in operation, the same being arranged between the driving-pulley on the car-wheel axle and the driven wheel or pulley on the armature-shaft of the dynamo, and the same being of such a construction that under all the various conditions due to inequalities in the road-bed and varying weights in the body of the car constant frictional contact is made at several different points with said car-axle pulley or driver and the driven wheel on the armature-shaft, such contact being made at all times.

A further object of this invention is to produce a device of the character stated in which the several parts which make operative frictional contact are automatically adjustable in relation to the contact-surfaces of the driver on the car-wheel axle and the driven wheel on the armature-shaft of the dynamo irrespective of the varying positions of the said driver during the movements of the train.

A further object of this invention is to dispense with the use of a belt or belts and to provide an efficient arrangement of friction-pulleys in operative contact with the driver on the car-wheel axle and the driven dynamo-pulley, whereby when it becomes necessary to remove the car-wheel axle for repairs this can be accomplished in very little time and without disturbing the positions of either the dynamo and its parts or of the friction-drive for operating the dynamo.

This invention consists more especially in the arrangement of a suitable frame having slidably-arranged pulleys and an actuating means whereby said pulleys are brought in frictional contact at several points with the driver on the car-wheel axle and the driven pulley on the armature-shaft of the dynamo, the said slidably-arranged pulleys or idlers having a normal tendency to draw together, whereby, although the frame is loosely arranged at a point between the driver and driven pulley, frictional contact is made at several points and an ideal construction of friction-drive is produced for use more especially in systems of lighting railway-cars by means of electricity generated from a car-wheel axel, where the driver is always liable of moving out of its predetermined position.

The arrangements and constructions of the several parts of the device comprising my novel form of friction-drive are such that the friction-pulleys or idlers will follow as well as maintain their frictional contact with the varying positions of the driver on the car-wheel axle, the whole apparatus or device assuming such different positions of its own accord. This is solely due to the fact that the frame of the device is not anchored to some rigid support, but has its idlers in rolling frictional contact at several points with the operating-surfaces of the driver and the driven wheel. When the driving-pulley, which is a part of the car-wheel axle, moves up or down, the distance between the said driver and the driven pulley is either increased or decreased, and the angle of operative contact of the parts of the frame of the apparatus or device, which in the first instance was fixed—that is, before any movement takes place—soon varies with the movement of the train, the friction-wheels or idlers rolling over the respective surfaces of the driver and the driven wheel and assuming the best positions to adapt the device to the constantly-varying conditions and at all times keeping in frictional contact with the driver and the driven pulley. Furthermore, by the arrangement of certain springs a given pressure between the contacting surfaces can be produced, and owing to the additional points of contact greater power can be transmitted from the driver to the driven wheel, and all possibility of "slip" between the parts is entirely overcome.

The invention furthermore consists in the several novel arrangements and combinations of parts and in the various details of the construction thereof, all of which will be fully described in the accompanying specification and finally embodied in the clauses of the claim.

The invention is illustrated in the accompanying drawings, in which—

Figure 1 is a sectional view of a portion of a car-truck and one of the car-wheel axles, illustrating in side view the application of my invention thereto. Fig. 2 is a plan view of said parts represented in Fig. 1, and Fig. 3 is a sectional view, on an enlarged scale and taken on line $x$ $x$ in said Fig. 1, of a pair of friction-pulleys or idlers to be placed in operative rolling contact with the pulleys on the car-wheel axle and on the armature-shaft of the dynamo.

Similar letters of reference are employed in all of the above-described views to indicate corresponding parts.

In said drawings, A indicates the car-truck, $a$ the equalizing-bars, and $a'$ the cross-beams at the ends of the truck.

B is any one of the well-known forms of dynamo, which is supported by means of suitable brackets or straps, as $b$, to said cross-beam $a'$. The armature-shaft $b'$ is provided at one end with a pulley $b^2$, which is preferably provided with a covering of rawhide $b^3$, as indicated in Fig. 1. Upon the car-wheel axle $a^2$ I have secured a pulley-wheel $a^3$, which is preferably made in halves and is provided with flanges $a^4$ and bolts $a^5$, whereby the halves of said pulley can be secured together and firmly clamped in the desired position upon the car-wheel axle and in alinement with the pulley $b^2$ of the dynamo, as will be evident from Fig. 2. With the said dynamo are connected the usual circuit-wires, (not shown in the drawings,) which extend from the said dynamo to suitably-placed lamps and other electrical translating devices in the body of the car.

To cause the rotation of the armature-shaft of the dynamo from the rotating car-wheel axle, I have provided the friction drive or apparatus D, (illustrated more particularly in Fig. 3,) which consists, essentially, of a pair of pulleys or idlers $d$ and $d'$, adapted to be brought in operative and rolling frictional contact with the surfaces of said pulleys $a^3$ and $b^2$, as clearly illustrated in Fig. 1, whereby by such arrangement of the two pulleys $d$ and $d'$ I obtain greater driving power to drive the armature-shaft pulley and also a constant frictional and operative contact between the surfaces of the several pulley-wheels, such contact being made at several points of the said wheels. Said pulley-wheels $d$ and $d'$ each have a spindle or shaft $d^2$, the ends of which are fitted in bearings $d^5$ of a pair of frames $d^3$ and $d^4$. Said frame $d^4$ is fixed to a pair of rods $d^6$, but said frame $d^3$ is slidably arranged on said rods, said rods passing through perforations $d^7$ in the bearings $d^5$ of the frame $d^3$, while the lower ends of said rods are preferably provided with the screw ends $d^{10}$, whereby said ends are firmly screwed into the screw-holes in the bearing portions of the said frame $d^4$. The upper ends of said rods $d^6$ are provided with washers $d^8$ and suitable nuts $d^9$. Springs $e$, which encircle said rods on the portions between the said washers $d^8$ and the bearings of the frame $d^3$, are employed, the normal tendency of said springs being to force the pulley $d$ in a downward direction toward the pulley $d'$, and when the device D is placed between the two pulleys $a^3$ and $b^2$ the result of such tendency of said springs $e$ will be to retain said device D in its operative position between the driver $a^3$ and the driven pulley $b^2$, and said pulleys $d$ and $d'$ will always be in rolling frictional contact with said pulleys $a^3$ and $b^2$ on opposite sides of a plane passing through the central axes of the car-wheel axle and the armature-shaft of the dynamo. Owing to the sliding motion of the pulley $d$ on the rods $d^6$ any difference of height between the car-wheel axle and the armature-shaft of the dynamo on the car-truck caused by the varying loads in the body of the car and any vibratory motion of the car-wheel axle in its bearings will be compensated for by the said springs $e$, thereby under all conditions resulting in a perfect and operative rolling frictional contact of the pulleys or idlers $d$ and $d'$ on opposite sides, respectively, of the pulleys $a^3$ and $b^2$, with the desired result of producing a simple, practical, and noiselessly-operating mechanism for operating a dynamo from a rotating car-wheel axle.

In order that the spindles or shafts $d^2$ may be properly protected from dirt and dust, the ends of the several bearing portions $d^5$ of the device D are preferably closed by means of suitably-constructed dust caps or covers $h$, which are secured in position by bolts or screws $h'$.

As will be seen more especially from Fig. 3, the frames $d^3$ and $d^4$ are respectively provided with screw-threaded bosses or enlargements $d^{11}$ and $d^{12}$, a rod or post $f$ being screwed in the upper boss or enlargement $d^{12}$ and a similar rod or post $f'$ being screwed in the lower boss or enlargement $d^{11}$. Each rod or post $f$ and $f'$ is preferably flattened on the opposite sides, as at $f^2$. (See Fig. 2.) The said rod or post $f$ is movable vertically between the side pieces of a suitable yoke or frame $i$, which is secured by means of bolts $i$, or in any other well-known manner, to a bar or block $a^4$, attached on the said cross-beam $a'$ by means of bolts $a^6$, and the said rod or post $f'$ is likewise movable vertically between the side pieces of a similar yoke or frame $i^2$, which is secured to a block or bar $a^8$ on the under side of said cross-beam $a'$ by means of bolts $a^7$, all of which will be clearly understood from an inspection of Figs. 1 and 2. One object of this arrangement of posts or rods $f$ and $f'$ and yokes or frames $i$ and $i^2$ is to limit the lateral movement of the device D, and thereby prevent any possible disengagement of the idlers or pulleys $d$ and $d'$ from their operative frictional contact with the driver $a^3$ and the driven wheel $b^2$. As will be seen from the several figures of the drawings, the said rods or posts $f$ and $f'$ may be provided with suitable nuts $f^3$, which can be screwed tightly against the edges $i^4$ of the frame $i$ and the edges $i^5$ of the frame $i^2$, whereby the springs $e$ can be suitably compressed to bring the friction-wheels or idlers $d$ and $d'$ farther apart and out of their operative frictional contact with the driver $a^3$ when it becomes necessary to remove the car-wheel axle for repairs and without disturbing the position of the dynamo and its parts, the said yokes or frames $i$ and $i^2$ retaining the said device D in position until the car-wheel axle has again been placed in its bearings in the car-truck, when the nuts $f^3$ can be released, and the springs $e$ will again cause the operative and rolling frictional contact between the several pulleys $a^3$, $d$ $d'$, and $b^2$, as will be clearly understood. The said pulley-wheels or idlers $d$ and $d'$ may be covered with rawhide or other like material $d^{13}$, thereby providing a good frictional contact between the engaging surfaces of the several pulleys and also reducing all noise to a minimum.

The operations of the several parts of the device are practical, and in construction are very simple, and a noiselessly-operating mechanism has been provided for operating a dynamo from a rotating car-wheel axle.

The armature-wires of the dynamo may be arranged in any well-known manner, and any suitable construction of dynamo can be used. It will be further understood that I may use in connection with the dynamo and its circuits any of the well-known forms of pole-changers, acting automatically or otherwise, whereby the current can be made to travel in either direction, according to the direction of the travel of the car.

It will also be evident that changes may be made in the several arrangements and combinations of parts of the driving mechanism herein set forth, as well as in the details of the construction thereof, without departing from the scope of my present invention. Hence I do not limit my invention to the exact arrangements and combinations of parts as herein described and illustrated, nor do I limit myself to the exact details of the construction of such parts.

Having thus described my invention, what I claim is—

1. The combination, with a car-wheel axle, a driving-pulley thereon, and a truck-frame, of a dynamo located on the car-truck, having an armature-shaft, a pulley-wheel on said shaft, a frame located between said driving-pulley and the pulley on the armature-shaft, friction-pulleys or idlers in said frame in rolling frictional contact at several points with said driving-pulley and said armature-shaft pulley and making contact on opposite sides of the central axes of said pulleys, and means connected with said truck-frame to prevent lateral motion of said friction-pulleys or idlers, consisting, essentially, of yokes or frames $i$ and $i^2$, and posts or rods $f$ and $f'$ on said frames in which said friction-pulleys or idlers are located, substantially as and for the purposes set forth.

2. The combination, with a car-wheel axle, a driving-pulley thereon, and a truck-frame, of a dynamo located on the car-truck, having an armature-shaft, a pulley-wheel on said shaft, a frame D located between said driving-pulley and the pulley on the armature-shaft, bearings connected with said frame D, shafts or spindles rotating in said bearings, spring-actuated friction-pulleys or idlers on said shafts or spindles in rolling frictional contact at several points with said driving-pulley and said armature-shaft pulley and making contact on opposite sides of the central axes of said pulleys, and means connected with said truck-frame to prevent lateral motion of said pulleys, substantially as and for the purposes set forth.

3. The combination, with a car-wheel axle, a driving-pulley thereon, and a truck-frame, of a dynamo located on the car-truck, having an armature-shaft, a pulley-wheel on said shaft, a frame D located between said driving-pulley and the pulley on the armature-shaft, bearings connected with said frame D, shafts or spindles rotating in said bearings, spring-actuated friction-pulleys or idlers on said shafts or spindles in rolling frictional contact at several points with said driving-pulley and said armature-shaft pulley and making contact on opposite sides of the central axes of said pulleys, and means connected with said truck-frame to prevent lateral motion of said pulleys, consisting, essentially, of yokes or frames $i$ or $i^2$, and posts $f$ and $f'$ on said frame in which said friction-pulleys or idlers are located, substantially as and for the purposes set forth.

4. The combination, with a car-wheel axle, a driving-pulley thereon, and a truck-frame, of a dynamo located on the car-truck, having an armature-shaft, a pulley-wheel on said shaft, a frame D located between said driving-pulley and the pulley on the armature-shaft, bearings connected with said frame D arranged one above the other, shafts or spindles rotating in said bearings, friction-pulleys or idlers on said shafts or spindles, rods $d^6$ secured to said lower bearings and passing through perforations in said upper bearings, and springs $e$ encircling said rods exerting pressure upon said upper bearings, whereby said friction-pulleys or idlers are brought in rolling frictional contact at several points with said driving-pulley and said armature-shaft pulley and making contact on opposite sides of the central axes of said pulleys, substantially as and for the purposes set forth.

5. The combination, with a car-wheel axle, a driving-pulley thereon, and a truck-frame, of a dynamo located on the car-truck, having an armature-shaft, a pulley-wheel on said shaft, a frame D located between said driving-pulley and the pulley on the armature-shaft, bearings connected with said frame D arranged one above the other, shafts or spindles rotating in said bearings, friction-pulleys or idlers on said shafts or spindles, rods $d^6$ secured to said lower bearings and passing through perforations in said upper bearings, springs $e$ encircling said rods exerting pressure upon said lower bearings, whereby said friction-pulleys or idlers are brought in rolling frictional contact at several points with said driving-pulley and said armature-shaft pulley and making contact on opposite sides of the central axes of said pulleys, and means connected with said truck-frame to prevent lateral motion of said pulleys, substantially as and for the purposes set forth.

6. The combination, with a car-wheel axle, a driving-pulley thereon, and a truck-frame, of a dynamo located on the car-truck, having an armature-shaft, a pulley-wheel on said shaft, a frame D located between said driving-pulley and the pulley on the armature-shaft, bearings connected with said frame D arranged one above the other, shafts or spindles rotating in said bearings, friction-pulleys or idlers on said shafts or spindles, rods $d^6$ secured to said lower bearings and passing through perforations in said upper bearings, springs $e$ encircling said rods exerting pressure upon said lower bearings, whereby said friction-pulleys or idlers are brought in rolling frictional contact at several points with said driving-pulley and said armature-shaft pulley and making contact on opposite sides of the central axes of said pulleys, and means connected with said truck-frame to prevent lateral motion of said pulleys, consisting, essentially, of yokes or frames $i$ and $i^2$, and posts $f$ and $f'$ on said frame in which said friction-pulleys are located, substantially as and for the purposes set forth.

In testimony that I claim the invention set forth above I have hereunto set my hand this 22d day of July, 1898.

MORRIS MOSKOWITZ.

Witnesses:
FREDK. C. FRAENTZEL,
WALTER H. TALMAGE.